United States Patent
Laberny et al.

(10) Patent No.: US 12,503,945 B2
(45) Date of Patent: Dec. 23, 2025

(54) TURBOMACHINE BLADE, TURBOMACHINE AND METHOD FOR MANUFACTURING THE BLADE

(71) Applicant: SAFRAN HELICOPTER ENGINES, Bordes (FR)

(72) Inventors: Damien Laberny, Moissy-Cramayel (FR); Loïs Pierre Denis Vive, Moissy-Cramayel (FR); Alexandre Hervé René Montpellaz, Moissy-Cramayel (FR); Fabrice Iparaguirre, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/869,635

(22) PCT Filed: May 29, 2023

(86) PCT No.: PCT/FR2023/050747
§ 371 (c)(1),
(2) Date: Nov. 26, 2024

(87) PCT Pub. No.: WO2023/233096
PCT Pub. Date: Dec. 7, 2023

(65) Prior Publication Data
US 2025/0297550 A1    Sep. 25, 2025

(30) Foreign Application Priority Data

May 31, 2022  (FR) .................................... 2205208

(51) Int. Cl.
*F01D 5/18*  (2006.01)

(52) U.S. Cl.
CPC ............ *F01D 5/18* (2013.01); *F05D 2230/60* (2013.01); *F05D 2260/20* (2013.01)

(58) Field of Classification Search
CPC .................................. F01D 5/18; F01D 5/147
See application file for complete search history.

(56) References Cited

U.S. PATENT DOCUMENTS

| 8,162,594 B2 * | 4/2012 | Guimbard | ............... F01D 5/189 |
| | | | 415/115 |
| 9,506,350 B1 * | 11/2016 | Memmen | ................ F01D 5/147 |
| (Continued) | | | |

FOREIGN PATENT DOCUMENTS

| DE | 102016113058 A1 | 2/2017 |
| EP | 3854991 A2 | 7/2021 |
| (Continued) | | |

OTHER PUBLICATIONS

Search Report and Written Opinion issued in International Application No. PCT/FR2023050747, mailed Jul. 10, 2023.

*Primary Examiner* — Michael L Sehn
(74) *Attorney, Agent, or Firm* — Bookoff McAndrews, PLLC (57) ABSTRACT

Turbomachine blade including an external shell including a pressure-side wall and a suction-side wall delimiting between them an interior volume, an insert arranged in the interior volume so as to form an air passage between the insert and the external shell; and at least one breakable joining portion, connected on the one hand to the insert and on the other hand to the external shell; wherein one at least of the mechanical breaking resistance of the breakable joining portion, the mechanical breaking resistance between the breakable joining portion and the external shell and the mechanical breaking resistance between the breakable joining portion and the insert is less than the mechanical breaking resistance of the external shell and the mechanical breaking resistance of the insert.

15 Claims, 4 Drawing Sheets

(56) References Cited

U.S. PATENT DOCUMENTS

| | | | |
|---|---|---|---|
| 11,828,192 B2 * | 11/2023 | Vial | .......................... F01D 5/18 |
| 2017/0101893 A1 | 4/2017 | Marsh et al. | |
| 2020/0284152 A1 | 9/2020 | Blaney et al. | |
| 2022/0112812 A1 | 4/2022 | Vial et al. | |

FOREIGN PATENT DOCUMENTS

| | | | | |
|---|---|---|---|---|
| WO | 2017171763 A1 | 10/2017 | | |
| WO | WO-2020148512 A2 * | 7/2020 | ............... | F01D 5/18 |

* cited by examiner

TURBOMACHINE BLADE, TURBOMACHINE AND METHOD FOR MANUFACTURING THE BLADE

CROSS-REFERENCE TO RELATED APPLICATIONS

This is a National Stage Application under 35 U.S.C. § 371 of International Application No. PCT/FR2023/050747, filed May 29, 2023, now published as WO 2023/233096 A1, which claims priority to French Patent Application No. 2205208, filed on May 31, 2022, the entireties of which are incorporated herein by reference.

TECHNICAL FIELD

The present disclosure relates to turbomachine blades, in particular turbomachine high-pressure nozzle blades.

PRIOR ART

Turbomachine high-pressure nozzle blades are known, allowing the flow of hot gas leaving the combustion chamber to be guided in order to drive turbines and provided with a cooling circuit for preserving the integrity of the blades even when subjected to extreme operating temperatures.

Hollow blades are used into which inserts are applied to obtain better distribution of the cooling gas flows within the blade and thus better cooling of the blade. The inserts can be attached at the tip or the root of the blade, the insert and the blade then being independent over most of the height of the blade.

To optimize the geometry and reduce the costs, it would be advantageous to manufacture the blade and the insert together. However, the absence of continuity of matter between the insert and an exterior portion of the blade can then cause deformation which result in the appearance of cracks within the blade, or even non-compliance with manufacturing tolerances and thus poor flow of cooling gas flows. These problems associated with the manufacture of the blade are all the more present in the case of manufacture by additive methods.

However, providing for continuity of matter between the insert and an exterior portions of the blade can cause a transmission of stresses between portion subjected to extreme thermomechanical stresses during the operation of the turbomachine, thus causing breakage within the blade, the insert and an exterior portion of the blade.

DISCLOSURE OF THE INVENTION

The present disclosure seeks to propose a turbomachine blade, the manufacture of which is facilitated without degrading its performance during the operation of the turbomachine.

To this end, the present disclosure relates to a turbomachine blade comprising: an external shell comprising a pressure-side wall and a suction-side wall delimiting between them an interior volume, an insert arranged in the interior volume so as to form an air passage between the insert and the external shell; and at least one breakable joining portion, connected on the one hand to the insert and on the other hand to the external shell, in which one at least of mechanical breaking resistance of the breakable joining portion, mechanical breaking resistance between the breakable joining portion and the external shell and mechanical breaking resistance between the breakable junction portion and the insert is less than the mechanical breaking resistance of the external shell and the mechanical breaking resistance of the insert.

The pressure-side wall and the suction-side wall can join at a leading edge, on the one hand, and a trailing edge on the other hand. The cross section of the external shell can be closed, for example viewed in a transverse section plane in the general direction in which the blade extends. The cross section of the external shell can be substantially closed, for example closed with the exception of localized cooling openings allowing for example cooling by a film of air.

What is meant by an air passage is a continuous volume between an inlet and an outlet distinct from the inlet allowing the passage of air or of any other fluid between the inlet and the outlet.

What is meant by breakage between two parts is a complete breakage or a partial breakage of the connection between the two parts. What is meant by breakage between two portions of a part is a complete breakage or a partial breakage between said two portions.

What is meant by mechanical breaking resistance is mechanical resistance to breakage in response to thermal or mechanical stresses, for example a simple or compound force, repeated or not, particularly in tension, in compression, in shear and/or in bending, or any other known mode of loading known to a person skilled in the art.

In the case of a stress involving a breakable joining portion, what is understood by breaking resistance of the external shell is the breaking resistance of a region of the external shell also acted on by said stress, generally around an interface between the breakable joining portion and the external shell. In the same manner, in the case of a stress involving the breakable joining portion, what is understood by breaking resistance of the insert is the breaking resistance of a region of the insert also acted on by said stress, generally around an interface between the breakable joining portion and the insert.

In other words, one at least of the mechanical breaking resistance of the breakable joining portion, the mechanical breaking resistance between the breakable joining portion and the external shell and the mechanical breaking resistance between the breakable joining portion and the insert is less than the mechanical breaking resistance of the external shell and the mechanical breaking resistance of the insert if,
- the mechanical breaking resistance of the breakable joining portion is less than the breaking resistance of the external shell and the breaking resistance of the insert; and/or
- the mechanical breaking resistance between the breakable joining portion and the external shell is less than the mechanical breaking resistance of the external shell and the mechanical breaking resistance of the insert; and/or
- mechanical breaking resistance between the breakable joining portion and the insert is less than the mechanical breaking resistance of the external shell and the breaking resistance of the insert.

In other words, following the appearance of stresses in the assembly formed from the breakable joining portion, the outer shell and the insert, the possible breakage is localized in the breakable joining portion, in the sense that the breakage separates the breakable joining portion into two pieces, and/or at one at least of the interfaces between, on the one hand, the breakable joining portion and on the other hand the insert or the external shell, in the sense that the breakage separates the breakable joining portion from the insert and/or from the external shell. In particular, following the appearance of stresses in the assembly formed from the breakable joining portion, the external shell and the insert, the breakage takes place neither within the insert nor within the external shell before the breakable joining portion itself or one of its interfaces with the insert or the external shell breaks.

For the sake of conciseness but without loss of generality, the term breakage will be used hereafter to designate the breakage of the breakable joining portion itself and/or breakage between the breakable joining portion and the external shell and/or breakage between the breakable joining portion and the insert, without distinction, unless a particular mention or the context give the term breakage a different meaning.

Prior to breakage, the breakable joining portion allows supporting the insert in the external shell, ensuring geometric continuity of the external shell and of the insert, which allows improving the manufacturability of the blade. A blade of this type is particularly suitable for manufacturing by an additive manufacturing method.

Geometric continuity designates continuity of matter within a part or an assembly of parts, independently of the shape of the part or of the assembly of parts. In this case, it is possible to pass continuously from the external shell to the insert via the breakable joining portion, whether or not the parts are in the continuation of one another in terms of shape, of materials, etc.

In case of a mechanical or thermomechanical stress causing breakage, the breakage is localized and/or confined to the breakable joining portion or to one of its interfaces with the insert and the external shell. The breakage confined to the breakable joining portion thus allows preventing damage to the blade, particularly to the insert and to the external shell.

Once the blade is manufactured, complete breakage also allows making the insert geometrically independent of the external shell while holding the external shell at a distance from the insert, in particular at a distance associated with good effectiveness of the cooling of the blade.

Breakage can be preceded, accompanied or replaced by one or more other instances of damage, such as plastification. The mechanical resistance associated with this other damage can be considered alternatively or complementarily to the mechanical breaking resistance. For example, in the case of damage in the form of plastification, plastification is localized and/or confined to the breakable joining portion or to one of its interfaces with the insert and the external shell, thus allowing preventing damage to the blade, particularly the insert and the outer shell.

Once the blade is manufactured, damage, for example total or partial breakage or plastification, can also cause a redistribution of the stresses within the part allowing preventing further undesired damage in the blade.

During the operation of the turbomachine, the temperature of the external shell is higher than the temperature of the insert, so that the external shell (belonging to a so-called "hot" zone) and the insert (belonging to a so-called "cold" zone) dilate in different ways. This differential dilation can lead to breakage at the breakable joining portion. After breakage, the independence of the external shell and the insert thus allows ensuring the independence of the thermomechanical movements between the hot zones and the cold zones, and thus preventing the risk of breakage within the external shell or the associated insert at different movements between the hot zones and cold zones.

The better manufacturability and the confinement of the breakage to the breakable joining portion allow ensuring the integrity of the external shell and of the insert during the operation of the turbomachine, allowing ensuring the cooling of the turbomachine blade, for example by internal forced convection or by impinging jet. In addition, by increasing the flexibility of manufacture, the presence of a breakable joining portion allows access to more sophisticated and higher-performance blade designs, particularly in terms of cooling. A blade of this type is therefore compatible with high-temperature operation of the turbomachine associated with high thermal performance.

In certain embodiments, the blade is a turbomachine high-pressure nozzle blade.

The high-pressure nozzle receives combustion gases at high temperature from the combustion chamber. By improving the cooling capacities of the high-pressure nozzle blades, the turbomachine can operate at high temperatures associated with high thermal performance.

It is understood, however, that the blade can be provided in other positions in the turbomachine. For example, the blade can be a blade of another nozzle, for example a low pressure nozzle.

In certain embodiments, the breakable joining portion has a length comprised between 0.2 mm and 2 mm, preferably between 0.5 mm and 1 mm.

The length of the breakable joining portion is measured in a rectilinear spacing direction between the insert and the external shell. The length of the breakable joining portion thus corresponds to the length between the respective interfaces of the breakable joining portion with the external shell and the insert, i.e. also at the smallest distance separating said interfaces.

The length of the breakable joining portion is one of the parameters determining good cooling of the external shell by impinging jet from the insert. The transverse section of the air passage, on which the flow speed of the air through the air passage depends, depends on the length of the breakable joining portion and on a width of the air passage, the width being measured perpendicularly to the length direction of the breakable portion and to the general direction in which the blade extends.

Such values of the length of the breakable joining portion ensure good effectiveness of the cooling of the blade, particularly of the external shell.

In certain embodiments, the breakable joining portion has a minimum thickness less than 0.5 mm, preferably less than 0.3 mm. The minimum thickness is the smallest thickness assumed locally by the breakable joining portion. Within the meaning of the present disclosure, the minimum thickness can also be located at the interface between the breakable joining portion and at least one of the external shell and the insert.

The thickness of the breakable joining portion is measured in a direction transverse to the neutral fiber of the breakable joining portion.

Such dimensions of the breakable joining portion allow providing the function of supporting the insert and the external shell with respect to one another, while concentrating the stresses at the constriction associated with the minimum thickness, which allows localizing breakage in the breakable joining portion, in particular at the constriction.

In certain embodiments, the thickness is minimal at a position at which the transverse section is minimal.

The transverse section is measured in a plane perpendicular to the neutral fiber of the breakable joining portion. The minimum transverse section is the smallest transverse section assumed locally by the breakable joining portion. Within the meaning of the present disclosure, the minimum transverse section can also be located at the interface between the breakable joining portion and at least one of the external shell and the insert.

Such dimensions of the breakable joining portion allow ensuring the function of supporting the insert and the external shell, while ensuring a stress concentration at the constriction associated with the minimum transverse section, allowing localizing the breakage in the breakable joining portion, in particular at the constriction.

In certain embodiments, the breakable joining portion comprises a first portion and a second portion connected together while forming an angle less than 90°, preferably less than 45°. Such an angle easily concentrates the stresses and gives a preferred breakage direction.

In certain embodiments, at least one of the insert and the external shell is locally reinforced at its connection with the breakable joining portion.

What is meant by local reinforcement at a connection with the breakable joining portion is a reinforcement at least in a zone acted on during the application of a stress on the breakable joining portion.

A local reinforcement can be accomplished in different ways, for example by an extra thickness, a mechanical treatment or a chemical treatment.

This reinforcement further allows localizing the breakage of the breakable joining portion and limiting the transmission of this breakage, and thus preserving the integrity of the external shell and/or of the insert.

The invention also relates to a blade comprising a plurality of breakable joining portions arranged in an air flow direction within the air passage.

The plurality of breakable joining portions allows providing better support of the insert and of the external shell for one another, along the air flow direction.

In certain embodiments, the distance between two successive breakable joining portions in the air flow direction is comprised between 0.2 mm and 3 mm, preferably between 0.4 mm and 1 mm.

Such a distance allows ensuring the function of supporting the breakable joining portion while allowing satisfying manufacturability constraints. For example, in the case of manufacture of the blade by a method comprising a step of additive manufacturing on a powder bed, such a distance allows ensuring the removal of the blade from the powder.

The invention also relates to a turbomachine comprising a blade according to the present invention.

The invention also relates to a manufacturing method for a turbomachine blade according to the present invention, comprising at least one step of additive manufacturing on a powder bed.

In certain embodiments, the turbomachine blade according to the present invention is manufactured as a single piece. The external shell, the insert and the breakable joining portion can be formed as a single part.

In certain embodiments, the turbomachine blade manufacturing method according to the present invention comprises at least one assembly step. The assembly step can comprise an assembly between the external shell 10 and the breakable joining portion 20 and/or an assembly between the external shell 10 and the insert 30.

The breakable junction portion allows reducing the deformation associated with additive manufacturing, for example by supporting the external shell and the insert with respect to one another, thus facilitating the manufacture of the blade.

The breakable joining portion thus allows ensuring the formation of the air passage allowing ensuring the cooling of the blade.

In certain embodiments, the method comprises a step of assembling the turbomachine blade in a turbomachine and a breaking step comprising at least one of the breakage of the breakage of the breakable joining portion, breakage between the breakable joining portion and the external shell and breakage between the breakable joining portion and the insert, and the breaking step being earlier than the step of assembling the turbomachine blade in the turbomachine.

The breakage can be accomplished by applying a stress on the blade, for example on the insert or the external shell. The breakage can also be accomplished by any other method such as the application of a thermal gradient or by chemical attack. When the breakage is accomplished prior to assembling the blade in the turbomachine, the blade can be freely manipulated, which gives access to numerous methods. The method can thus be optimized based on need, including in terms of time and money, while ensuring that breakage does in fact take place.

By accomplishing breakage prior to assembling the blade in the turbomachine, the external shell and the insert are geometrically independent as soon as assembly occurs, so that thermomechanical movements between the hot zones and cold zones are independent as soon as the blade is assembled in the turbomachine. The blade is thus compatible with a nominal operation of the turbomachine as soon as the blade is assembled in the turbomachine.

In certain embodiments, the method comprises a step of assembling the turbomachine blade in a turbomachine and a breakage step, the breakage step comprising at least one of breakage of the breakable joining portion, breakage between the breakable joining portion and the external shell and breakage between the breakable joining portion and the insert, and the breakage step being subsequent to the strep of assembling the turbomachine blade in the turbomachine.

The breakage can be accomplished by applying a stress on the blade, for example by operating the turbomachine at a predefined load level. When the breakage is accomplished after the assembly of the blade in the turbomachine, no prior breakage step is necessary, which facilitates the use of the blade. The breakage takes place with the blade assembled if it is necessary, otherwise, that signifies that the stresses are less than a dimensioning breakage threshold and endanger neither the integrity of the external shell nor the integrity of the insert.

BRIEF DESCRIPTION OF THE DRAWINGS

Other features and advantages of the object of the present disclosure will be revealed by the following description of embodiments, given by way of non-limiting examples with reference to the appended drawings.

DESCRIPTION OF THE EMBODIMENTS

Figure 1:
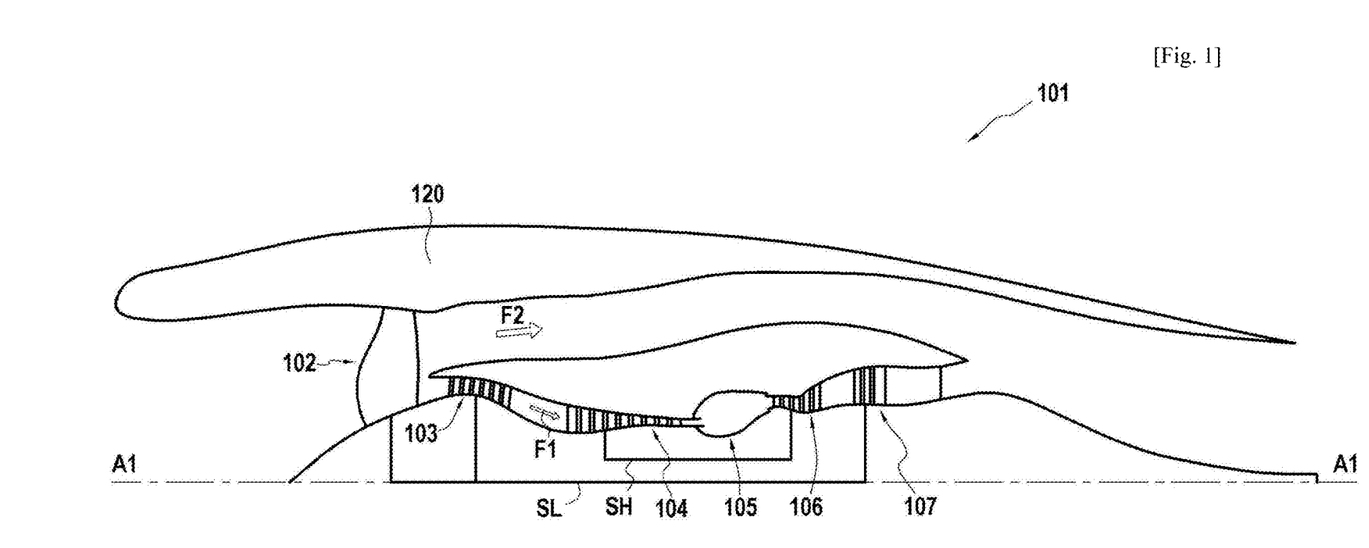
FIG. 1 is a half-section view of a turbomachine comprising a blade.

FIG. 1 shows a turbomachine 101 in longitudinal half-section in a plane passing through its main axis A1-A1. The turbomachine 101 is a two-spool and double-flow turbomachine, but other turbomachines can accommodate a blade according to one embodiment.

The turbomachine 101 comprises, from upstream to downstream along the air flow circulation, a fan 102, a low-pressure compressor 103 (also called a "booster"), a high-pressure compressor 104, a combustion chamber 105, a high-pressure turbine 106, and a low-pressure turbine 107. These different elements are installed inside a nacelle 120, so as to obtain a propulsion assembly comprising the nacelle 120 and the turbomachine 101.

Downstream of the fan 102, the air flow is divided into a first air flow portion (also called the primary flow) F1 passing through the low-pressure compressor 103, and a second air flow portion (also called the secondary flow) F2 flowing in bypass around the low-pressure compressor 103.

The fan 102 and the low-pressure compressor 103 are driven by the low-pressure turbine 107 via a main low-pressure shaft SL, while the high-pressure compressor 104 is driven by the high-pressure turbine 106 via a main high-pressure shaft SH. The main low-pressure shaft LS typically extends inside the main high-pressure shaft SH.

A blade 1 of the high-pressure turbine 106 will be described in relation to FIGS. 2, 3A and 3B.

The blade 1 comprises a pressure-side wall 11 and a suction-side wall 12. The pressure-side wall 11 and the suction-side wall 12 form an external shell 10.

The pressure-side wall 11 and the suction-side wall 12 delimit an interior volume of the external shell 10.

Optionally, openings 18 can be formed in the external shell 10, allowing circulation of air from the interior volume to an exterior of the external shell 10, in order to cool the external shell by film cooling. In other embodiments, the cross section of the external shell 10 can be closed over the entire height of the blade 1.

Optionally, the external shell 10 can be discontinuous in the height direction of the blade 1.

An insert 30 is provided in the interior volume of the exterior shell 10. The insert 30 can for example extend all along the blade 1 in the general direction in which the blade 1 extends.

Transversely to the general direction in which the blade 1 extends, the insert 30 is formed so as to leave an air passage 40 between the insert 30 and the external shell 10.

Figure 2:
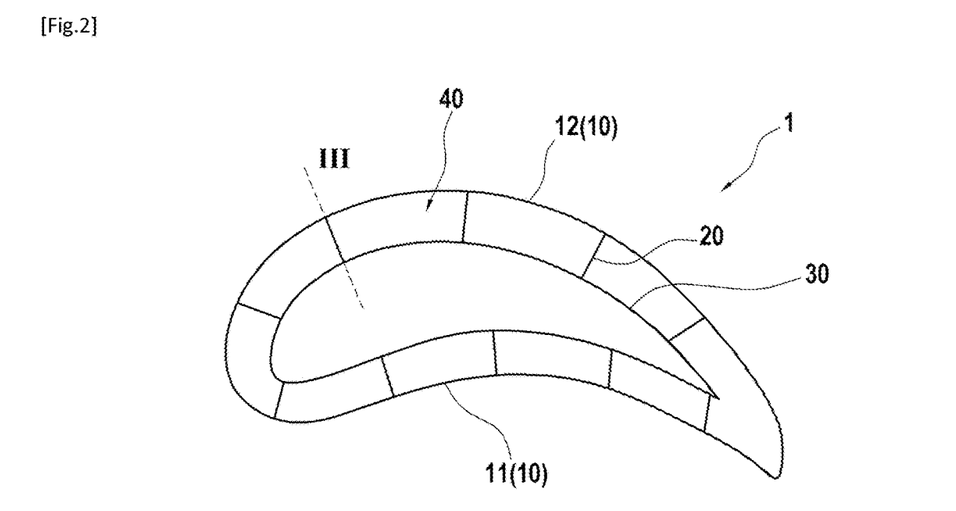
FIG. 2 is a schematic representation in a transverse section view of a blade according to one embodiment.

In the transverse section view of FIG. 2, the air passage 40 is formed between the insert 30 and the external shell 10 all around the insert 30. It is understood that the insert 30 and the external shell 10 can however be locally in contact, direct or indirect, and that an air passage 40 can be formed between the insert 30 and the external shell 10.

The external shell 10 can be cooled by air circulating in the air passage 40, for example by internal forced convention of this air.

In this case, a circulation of cold air within the air passage 40 allows extracting heat from the external shell 10, and thus holding the temperature of the external shell 10 to temperature levels limiting the premature aging of the external shell 10.

Alternatively or complementarily, the cooling of the external shell 10 can be accomplished by impinging jet.

In this case, the insert 30 is hollow and a circulation of cold air is provided inside the insert 30, and openings 38, for example in the form of through holes, are provided in the insert 30 in order to discharge the cold air circulating inside the insert 30 to the external shell 10 facing the openings 38, i.e. here from the inside of the insert 30 to the air passage 40.

The exterior shell 10 is designed in a material having good mechanical resistance at high temperature. Preferably, this material is also compatible with formation by additive manufacturing methods, for example an additive manufacturing method on a powder base.

Preferably, the entire blade 1 is designed in this same material.

A material of this kind is for example a nickel-based alloy, for example known alloys known under the following commercial designations:

René® 77 (with mass composition Ni 58%; Cr 15%; Co 15%; Al 4.3%; Mo 4.2%; Ti 3.3%; Fe 0.4%; C 0.17%; Si 0.1%; Mn 0.1%);

Inconel® 939 (with mass composition Cr 22.5%; Co 19.0%; W 2.0%; Nb 1.0%; Ti 3.7%; Al 1.9%; Ta 1.4%; Zr 0.1%; C 0.15%; B 0.01%, the rest being composed of Ni and the inevitable impurities); or Inconel® 738 (with mass composition Cr 16%; Co 8.5%; Al 3.4%; Ti 3.4%; W 2.6%; Mo 1.8%; Fe 0.5%; Si 0.3%; Mn 0.2%; C 0.17%).

The blade 1 comprises at least one breakable joining portion 20, connected on the one hand to the insert 30 and on the other hand to the external shell 10.

The structure of the breakable joining portion 20 will be detailed in relation to FIGS. 3A to 4F.

The external shell 10 comprises a plurality of breakable joining portions 20 distributed all around the insert 30 in a transverse plane, preferably regularly distributed all around the insert 30 in a transverse plane.

For example, two successive—in the air flow direction—breakable joining portions 20 are separated by a distance comprised between 0.2 mm and 3 mm, preferably between 0.4 mm and 1 mm.

Figure 3A:
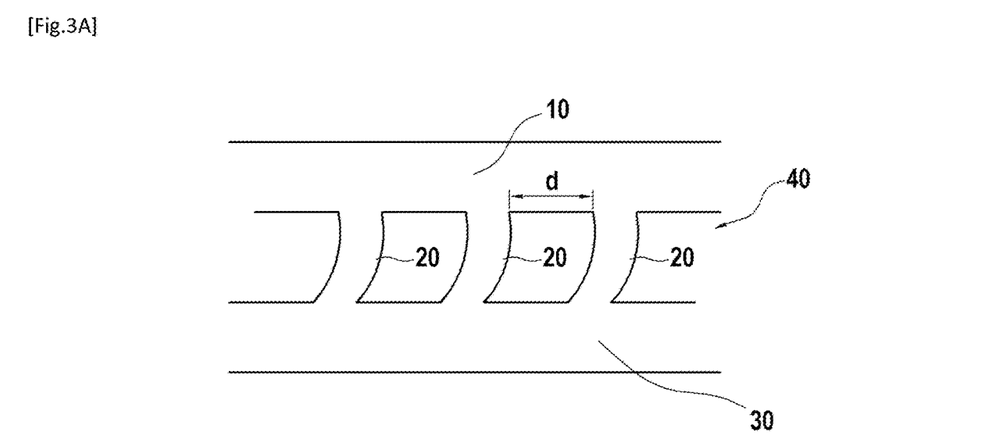
FIG. 3A is a schematic representation of a blade according to the embodiment in a section view in section plane Ill of FIG. 2.
Figure 3B:
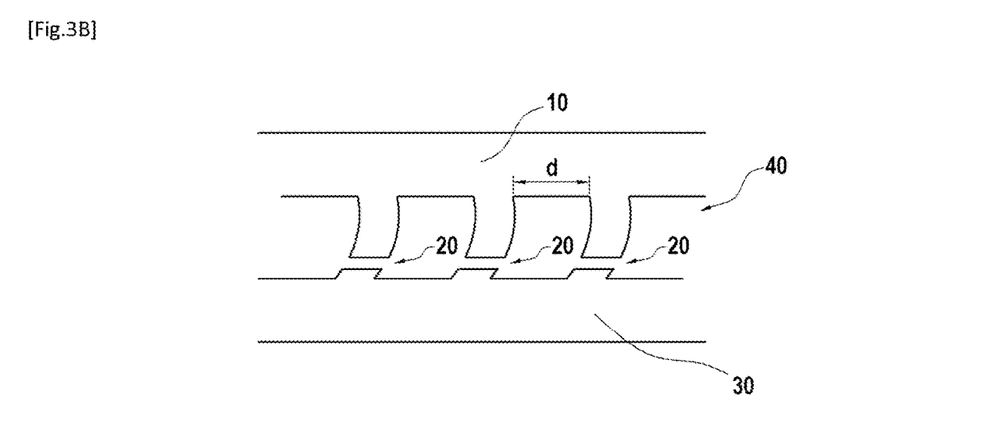
FIG. 3B is a schematic representation of the blade of FIG. 3A after breakage.

The breakable joining portions 20 of the plurality of breakable portions can have a similar structure, as in the example of FIGS. 3A and 3B. FIG. 3A shows the breakable joining portions 20 prior to breakage, while FIG. 3B shows the same breakable joining portions 20 after breaking under the influence of thermomechanical stresses.

It is understood however that the breakable joining portions 20 of the plurality of breakable joining portions 20 can have structures that differ from one another, each for example having one or more of the features described below relating to the breakable joining portions of the embodiments of 4A to 4F.

One at least of the mechanical breaking resistance of the breakable joining portion 20, the mechanical breaking resistance between the breakable joining portion 20 and the external shell 10 and the mechanical breaking resistance between the breakable joining portion 20 and the insert 30 is less than the mechanical breaking resistance of the external shell 10 and the mechanical breaking resistance of the insert 30.

In the case where it is the mechanical breaking resistance of the breakable joining portion 20 that is the weakest of these mechanical resistances, in the event of applying a stress causing breakage, the breakage occurs within the breakable joining portion 20.

In the case where it is the mechanical breakage resistance between the breakable joining portion 20 and the external shell 10 that is the weakest of these mechanical resistances, in the event of applying a stress causing breakage, the breakage occurs at the interface between the breakable joining portion 20 and the external shell 10.

In the case where it is the mechanical breaking resistance between the breakable joining portion 20 and the insert 30 that is the weakest of these mechanical resistances, in the event of applying a stress causing breakage, the breakage occurs at the interface between the breakable joining portion 20 and the insert 30.

In these three cases, breakage does not occur within the external shell 10 or within the insert 30, so that the integrity of the external shell 10 and of the insert 30 is preserved.

FIG. 3A shows three breakable joining portions 20 provided between the external shell 10 and the insert 30 prior to breakage.

In this example, it is the mechanical breaking resistance of the breakable joining portion 20 that is the weakest, so that applying a stress causing breakage causes breakage within the breakable joining portion 20, as shown in FIG. 3B.

FIGS. 4A to 4F show different embodiments of breakable joining portions 20 provided between the external shell 10 and the insert 30.

The breakable joining portion 20 has a length L comprised between 0.2 mm and 2 mm, preferably between 0.5 mm and 1 mm.

The length L is measured between two ends of the breakable joining portion 20, respectively connected to the insert 30 and to the external shell 10.

The external shell 10 can have a local reinforcement 15 at its connection with the breakable joining portion 20.

As a complement or as a replacement, the insert 30 can have a local reinforcement 35 at its connection with the breakable joining portion 20.

These local reinforcements 15, 35 allow in particular increasing the breaking resistance of the insert 30 and/or of the external shell 10, and thus ensure localization of the breakage within the breakable joining portion 20 or at the interface with the insert 30 or the external shell 10. Moreover, although the breakable joining portion 20 can be designed to concentrate stresses, the local reinforcement 15, 35 blocks the transmission of these stresses to the external shell 10 and/or the insert 30.

As shown in the embodiments of FIGS. 4A to 4F, the local reinforcements 15, 35 can take the form of an extra thickness.

Figure 4A:
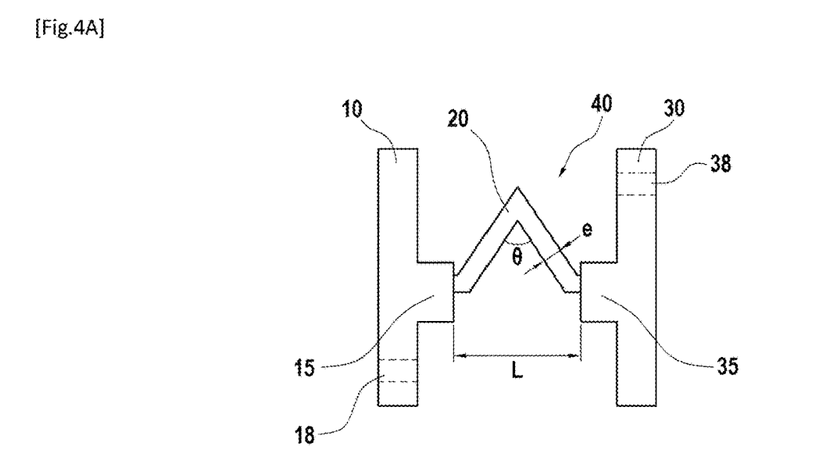
FIGS. 4A, 4B, 4C, 4D, 4E and 4F are schematic views of breakable joining portions according to distinct embodiments.

As shown in FIG. 4A, the breakable joining portion 20 can comprise two portions forming between them an angle θ less than 90°, preferably less than 45°.

Such an angle allows creating a stress concentration zone within the breakable joining portion 20, and thus ensuring breakage within the breakable joining portion 20.

Preferably, the connection between the two portions forming the angle θ lacks rounding or a groove, in order to further concentrate the stresses within the breakable joining portion 20.

The breakable joining portion 20 has a thickness e measured in a direction transverse to the breakable joining portion 20.

The thickness e, or at least the minimum thickness e, is less than the thickness of the external shell 10 and the thickness of the insert 30; the thickness of the external shell 10 and the thickness of the insert 30 being measured in their respective thickness directions.

Such thicknesses allow controlling the propagation of the breakage zone, controlling the perturbation of the air flow by the breakable joining portion 20 and controlling the speed of the air flow through the air passage 40.

The minimum thickness e of the breakable joining portion 20 is less than 0.5 mm, preferably less than 0.3 mm, preferably equal to 0.2 mm.

Preferably, the thickness e of the breakable joining portion 20 is greater than 0.5 mm, preferably greater than 0.3 mm, optionally with the exception of a single continuous zone where the thickness e is minimal.

This allows creating a single stress concentration zone which can cause breakage, and ensuring the mechanical strength of the rest of the breakable joining portion 20.

Figure 4B:
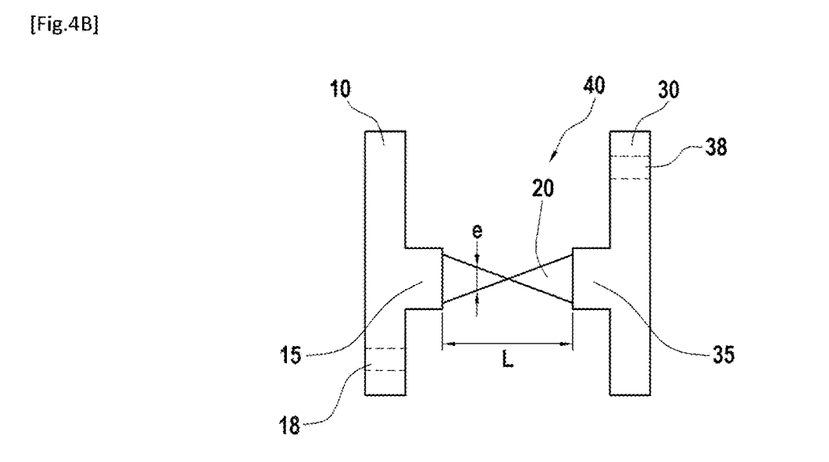
Figure 4C:
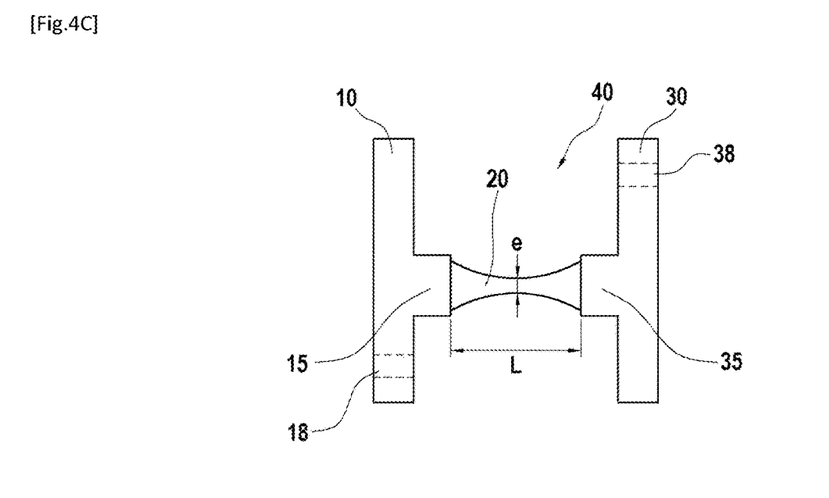

The thickness e of the breakable joining portion 20 can be minimal at a central portion of the breakable joining portion 20, as in the embodiment of FIGS. 4B and 4C.

In the embodiment of FIG. 4B, the thickness e of the breakable joining portion 20 decreases linearly from the two ends of the breakable joining portion 20 to the central portion of the breakable joining portion 20, where the thickness e is minimal.

In the embodiment of FIG. 4B, the minimum thickness e can be the smallest thickness e compatible with the manufacturing method of the blade 1, for which the breakable joining portion 20 can be of a single piece so as to ensure the geometric continuity of the external shell 10 and of the insert 30.

In the embodiment of FIG. 4C, the thickness e of the breakable joining portion 20 decreases nonlinearly, for example in a concave manner, from the two ends of the breakable joining portion 20 to a central portion of the breakable joining portion, where the thickness e is minimal.

In the embodiments of FIGS. 4A to 4C, the thickness e is minimal in a central portion of the breakable joining portion 20. The possible breakage thus preferably occurs in the central portion of the breakable joining portion 20, and is thus confined to the breakable joining portion 20.

The breakable joining portion 20 can also be symmetrical, for example having central symmetry or planar symmetry relative to a plane transverse to the breakable joining portion 20. This allows further increasing the likelihood that the breakage is contained in the center of the breakable joining portion 20, and in particular that the breakage is not propagated to the external shell 10 or to the insert 30.

Figure 4D:
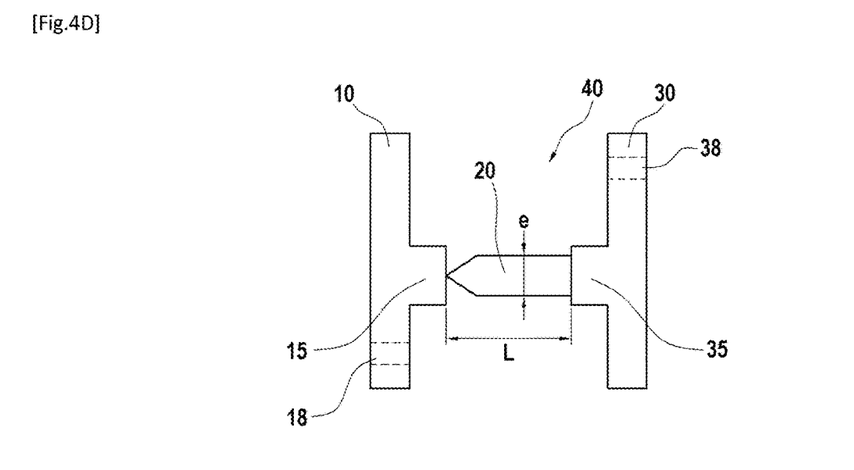
Figure 4E:
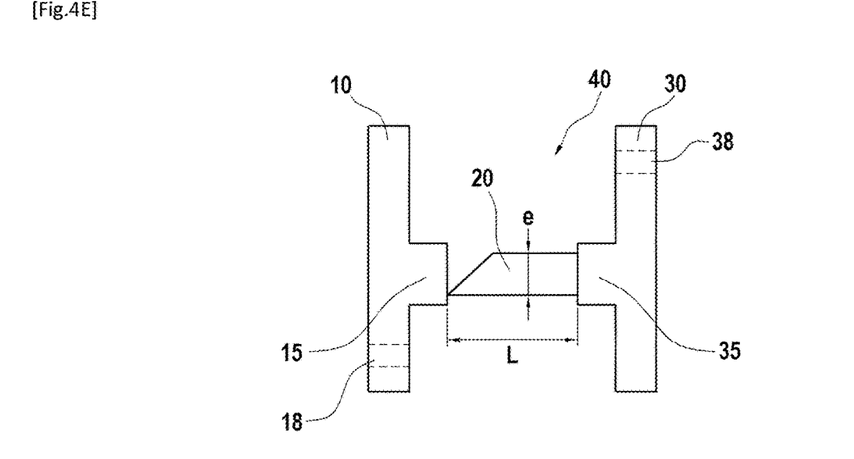
Figure 4F:
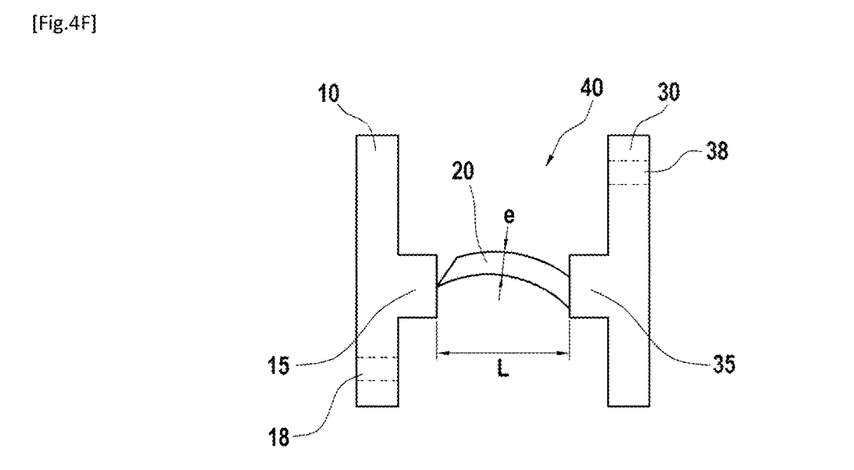

As illustrated in the embodiments of FIGS. 4D, 4E and 4F, the thickness e of the breakable joining portion 20 can be minimal at a peripheral portion of the breakable joining portion 20, for example at an interface between the breakable joining portion 20 and the external shell 10 or at an interface between the breakable joining portion 20 and the insert 30. The possible rupture thus preferably occurs at the connection which is associated with the minimum thickness e among the connection between the breakable joining portion 20 and the external shell 10 and the connection between the breakable joining portion 20 and the insert 30, i.e. breakage located between the breakable joining portion 20 and the external shell 10 or between the breakable joining portion 20 and the insert 30.

It is understood that the breakable joining portion 20 can have various shapes, rectilinear or curved, in a single piece or in several pieces forming an angle θ between them.

In the embodiments of FIGS. 4A to 4F, openings 18 are formed in the external shell 10 and openings 38 are formed in the insert 30. The openings 18 and the openings 38 can be arranged staggered, as illustrated, or face-to-face with one another, or even according to any relevant arrangement. It is understood that only the openings 18 of the external shell 10 or only the openings 38 of the insert 30 can be provided in the blade 1, or even that the blade could be lacking in openings 18 in the external shell 10 and openings 38 in the insert 30.

In all the embodiments described previously, geometric continuity, which is not necessarily a continuity of shape, between the external shell 10 and the insert 30 accomplished by the breakable joining portion 20 allows facilitating the manufacture of the blade 1, in particular by additive manufacturing methods, particularly additive manufacture on a powder bed.

The breakable joining portion 20 can then provide the support of the external shell and of the insert 30 with respect to one another during manufacture, and the satisfaction of manufacturing constraints.

The control of the breaking resistance within the breakable joining portion 20 or at its interface with the external shell 10 or the insert 30 can also be accomplished by a local modification of the manufacturing parameters to create a local fragility, for example a local degradation of the material or by a local integration of defects, of porosity for example. In the case of additive manufacture on a powder bed, local fragility can for example be introduced by locally modifying the power of the laser and/or the scanning speed of the laser over only one or several consecutive layers.

Once the blade 1 is manufactured, it can be assembled in a turbomachine 101, as is or after an ad hoc post-treatment.

During the life of the blade 1 and due to the dimensioning of the breakable joining portion 20, either a stress causing breakage will cause a local breakage in the breakable joining portion 20 or at its interface with the external shell 10 or the insert 30, or such a stress level will never be attained and no breakage will occur.

In both cases, the integrity of the external shell 10 and of the insert 30 will not be compromised.

It can also be advantageous to voluntarily apply a controlled force causing breakage in the breakable joining portion 20 or at its interface with the external shell 10 or the insert 30 in order to further ensure that the breakage is actually localized and/or confined in the breakable joining portion 20 or in one of its interfaces with the insert 30 and the external shell 10, and thus prevent damage to the blade 1.

In this case, the force causing the breakage can be applied before or after the assembly of the blade 1 in the turbomachine 101.

The blade 1 has a structure which is particularly suitable for production by an additive manufacturing method. A manufacturing method of the blade 1 can then be implemented, entirely or partially, by additive manufacturing, for example by a method of laser fusion on a powder bed.

In the embodiments of FIGS. 3A to 4F, the breakable joining portion 20 has been shown extending substantially between two positions of the external shell 10 and the insert 30 located facing one another, the external shell 10 and the insert 30 being substantially planar and parallel.

It is understood that any other shape and/or orientation of the external shell 10, of the breakable joining portion 20 and/or of the insert 30 compatible with the operation of the blade 1 within the turbomachine 101 can be provided for.

Optionally, the shape and/or the orientation of the external shell 10, of the breakable joining portion 20 and/or of the insert 30 can be specifically designed to be compatible with the manufacturing method of the blade 1 by additive manufacturing, for example by extending in a direction substantially parallel to the manufacturing direction and/or having volumes of matter in cantilever that do not cause manufacturing defects. Although the present invention has been described by referring to specific exemplary embodiments, it is obvious that modifications and changes can be applied to these examples without departing from the general scope of the invention as defined by the claims. In particular, individual features of the different embodiments illustrated/mentioned can be combined into additional embodiments. Consequently, the description and the drawings must be considered in an illustrative, rather than a restrictive sense.

The invention claimed is:

1. A turbomachine blade comprising:
an external shell comprising a pressure-side wall and a suction-side wall delimiting between them an interior volume,
an insert arranged in the interior volume so as to form an air passage between the insert and the external shell; and
at least one joining portion configured to break, connected at one end to the insert and at an other end to the external shell; wherein the at least one of a mechanical breaking resistance of the at least one joining portion, the mechanical breaking resistance between the at least one joining portion and the external shell and the mechanical breaking resistance between the at least one joining portion and the insert is less than the mechanical breaking resistance of the external shell and the mechanical breaking resistance of the insert, wherein at least one of the insert and the external shell is locally reinforced at its connection with the at least one joining portion.

2. The turbomachine blade according to claim 1, wherein the blade is a turbomachine high-pressure nozzle blade.

3. The turbomachine blade according to claim 1, wherein the at least one joining portion has a length between 0.2 mm and 2 mm.

4. The turbomachine blade according to claim 1, wherein the at least one joining portion has a length between 0.5 mm and 1 mm.

5. The turbomachine blade according to claim 1, wherein the at least one joining portion has a minimum thickness less than 0.5 mm.

6. The turbomachine blade according to claim 1, wherein the at least one joining portion has a minimum thickness less than 0.3 mm.

7. The turbomachine blade according to claim 1, wherein the at least one joining portion comprises a first portion and a second portion connected together while forming an angle less than 90°.

8. The turbomachine blade according to claim 1, wherein the at least one joining portion comprises a first portion and a second portion connected together while forming an angle less than 45°.

9. The turbomachine blade according to claim 1, wherein the at least one joining portion includes two or more joining portions arranged in an air flow direction within the air passage.

10. The turbomachine blade according to claim 9, wherein a distance between two successive joining portions in the air flow direction is between 0.2 mm and 3 mm.

11. The turbomachine blade according to claim 9, wherein a distance between two successive portions configured to break in the air flow direction is between 0.4 mm and 1 mm.

12. A turbomachine comprising the turbomachine blade according to claim 1.

13. A method for manufacturing the turbomachine blade according to claim 1, comprising at least one step of additive manufacture on a powder bed.

14. The manufacturing method according to claim 13, comprising a step of assembling the turbomachine blade in a turbomachine and a breaking step wherein
the breaking step comprises at least one of breaking of the at least one joining portion, breaking between the at least one joining portion and the external shell and breaking between the at least one joining portion and the insert; and the breaking step is earlier than the step of assembling the turbomachine blade into the turbomachine.

15. The manufacturing method according to claim 13, comprising a step of assembling the turbomachine blade in a turbomachine and a breaking step, wherein the breaking step comprises at least one of breaking the at least one joining portion, breaking between the at least one joining portion and the external shell, and breaking between the at least one joining portion and the insert; and the breaking step is subsequent to the step of assembling the turbomachine blade into the turbomachine.

* * * * *